(12) United States Patent
Walker (10) Patent No.: US 9,179,601 B2
(45) Date of Patent: Nov. 10, 2015

(54) CORN HEAD ASSEMBLY WITH CATCH PLATE

(71) Applicant: CNH America LLC, New Holland, PA (US)

(72) Inventor: Eric L. Walker, Leola, PA (US)

(73) Assignee: CNH Industrial America LLC, New Holland, PA (US)

( * ) Notice: Subject to any disclaimer, the term of this patent is extended or adjusted under 35 U.S.C. 154(b) by 109 days.

(21) Appl. No.: 13/780,694

(22) Filed: Feb. 28, 2013

(65) Prior Publication Data

US 2014/0237975 A1 Aug. 28, 2014

(51) Int. Cl.
*A01D 45/02* (2006.01)

(52) U.S. Cl.
CPC ............................ *A01D 45/021* (2013.01)

(58) Field of Classification Search
CPC ... A01D 45/02; A01D 45/021; A01D 45/028; A01D 45/24; A01D 45/22; A01D 45/30; A01D 45/00; Y10S 56/24
USPC ............................................ 56/113, 119, 312
See application file for complete search history.

(56) References Cited

U.S. PATENT DOCUMENTS

| | | | |
|---|---|---|---|
| 3,096,604 A | 7/1963 | Baker et al. | |
| 3,271,940 A * | 9/1966 | Ashton et al. | 56/105 |
| 3,589,110 A * | 6/1971 | Schreiner et al. | 56/11.7 |
| 3,759,021 A | 9/1973 | Schreiner et al. | |
| 3,808,783 A | 5/1974 | Sutherland et al. | |
| 3,995,413 A | 12/1976 | Durward | |
| 4,621,968 A | 11/1986 | Hutchison | |
| 4,630,430 A | 12/1986 | Weeks | |
| 5,040,361 A | 8/1991 | Briesemeister | |
| 5,195,309 A | 3/1993 | Mossman | |
| 5,528,887 A * | 6/1996 | Nagy et al. | 56/94 |
| 5,809,759 A * | 9/1998 | Zyla et al. | 56/298 |
| 5,878,561 A | 3/1999 | Gunn | |
| 5,913,803 A * | 6/1999 | Moster | 56/95 |
| 6,625,969 B2 | 9/2003 | Glazik | |
| 7,062,897 B2 | 6/2006 | Rickert et al. | |
| 7,073,316 B2 | 7/2006 | Resing et al. | |
| 7,240,471 B2 | 7/2007 | Mossman | |
| 7,373,767 B2 | 5/2008 | Calmer | |
| 7,377,091 B2 | 5/2008 | Shelton et al. | |
| 7,874,134 B1 | 1/2011 | Hoffman | |
| 7,913,480 B2 | 3/2011 | Christensen et al. | |
| 8,196,381 B2 * | 6/2012 | Herman et al. | 56/312 |
| 8,267,240 B2 | 9/2012 | Brim et al. | |
| 8,640,434 B2 * | 2/2014 | Lohrentz et al. | 56/119 |
| 2002/0144492 A1 * | 10/2002 | Calmer | 56/13.9 |
| 2005/0120694 A1 * | 6/2005 | Calmer | 56/14.7 |
| 2009/0183483 A1 * | 7/2009 | Herman et al. | 56/207 |
| 2011/0138764 A1 * | 6/2011 | Herman et al. | 56/207 |
| 2011/0146218 A1 * | 6/2011 | Carboni | 56/62 |

* cited by examiner

*Primary Examiner* — Árpád Fábián-Kovács
(74) *Attorney, Agent, or Firm* — Patrick M. Sheldrake; Seyed V. Sharifi T.

(57) ABSTRACT

A corn head assembly for a combine harvester capable of preventing or inhibiting grain from sliding off a row unit without inhibiting crop flow is disclosed. The corn head assembly is attached to a combine harvester for harvesting crop material. The corn head assembly includes a frame, a conveyor and a plurality of row units. Each row unit includes a catch plate for facingly engaging a flow of crop material and includes a facing surface having a nonplanar geometry. The nonplanar geometry is at least one of corrugations, scales, waves, chevron-shaped corrugations, weld beads, rods, and terraces.

23 Claims, 11 Drawing Sheets

CORN HEAD ASSEMBLY WITH CATCH PLATE

BACKGROUND OF THE INVENTION

The present invention relates generally to corn head assemblies for use with combine harvesters. In particular, the present invention relates to an improved corn head assembly that includes a catch plate.

Combines that harvest corn are provided with dividers, also generally known as snouts, for directing rows of corn stalks to ear separation chambers or stripping plates and then to an auger for conveying the corn to a feederhouse of the combine. Harvested corn is then processed to the combine's inner chambers where corn kernels are separated from the corn cob.

Conventional corn head assemblies have smooth areas behind their stripping plates, which serve to slide harvested corn to the corn head assembly's auger. These smooth areas however, also allow for harvested corn to slide away from the auger when an insufficient flow of crop material is processed through the corn head assembly, such as when the combine passes through an area of poor crop density or an end of a harvesting row. As such, corn that slides away from the auger falls to the ground and leads to significant loss of harvested crop material and ultimately an economic loss.

Thus, there is still a need for a combine harvester that is capable of preventing crop loss at the corn head assembly location associated with conventional corn head assemblies. Such a need is satisfied by the corn head assembly for a combine harvester of the present invention.

BRIEF SUMMARY OF THE INVENTION

In accordance with a first aspect of a preferred embodiment, the present invention provides a corn head assembly for a combine harvester that includes a frame, a conveyor and a plurality of row units. The frame mounts to a forward end of the combine harvester. The conveyor extends across the frame for conveying crop material to a combine feeding location. The plurality of row units extends forward from the frame. Each row unit includes a catch plate for facingly engaging a flow of crop material. The catch plate includes a facing surface having a nonplanar geometry.

In accordance with a second aspect, the present invention provides a corn head assembly for a combine harvester that includes a frame, a conveyor and a plurality of row units. The frame mounts to a forward end of the combine harvester. The conveyor extends across the frame for conveying crop material to a combine feeding location. The plurality of row units extends forward from the frame. Each row units includes a row unit frame, a stripping plate and a catch plate. The row unit frame has a breast plate. The stripping plate is mounted to the row unit frame. The catch plate is mounted rearwardly of the stripping plate and includes an engaging surface having a nonplanar geometry for engaging a flow of crop material and preventing crop material from sliding down the breast plate.

In accordance with a third aspect, the present invention provides a corn head assembly for a combine harvester including a frame, an auger, and a plurality of row units. The frame has a channel leading to a combine feeding location. The auger extends across the frame for conveying crop material to the combine feeding location. A plurality of row units extend forward from the frame and each row unit includes a means for preventing crop material from sliding off the row unit, and preferably from sliding down a breast plate of the row unit.

BRIEF DESCRIPTION OF THE SEVERAL VIEWS OF THE DRAWINGS

The foregoing summary, as well as the following detailed description of the preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Reference will now be made in detail to the preferred embodiments of the invention illustrated in the accompanying drawings. Wherever possible, the same or like reference numbers will be used throughout the drawings to refer to the same or like features. It should be noted that the drawings are in simplified form and are not drawn to precise scale. In reference to the disclosure herein, for purposes of convenience and clarity only, directional terms such as top, bottom, above, below and diagonal, are used with respect to the accompanying drawings. Such directional terms used in conjunction with the following description of the drawings should not be construed to limit the scope of the invention in any manner not explicitly set forth. Additionally, the term "a," as used in the specification, means "at least one." The terminology includes the words above specifically mentioned, derivatives thereof, and words of similar import.

The terms "grain," "tailing," and "crop material" are used throughout the specification for convenience and it should be understood that these terms are not intended to be limiting. Thus, "grain" refers to that part of a crop which is harvested and separated from discardable portions of the crop material.

Figure 1:
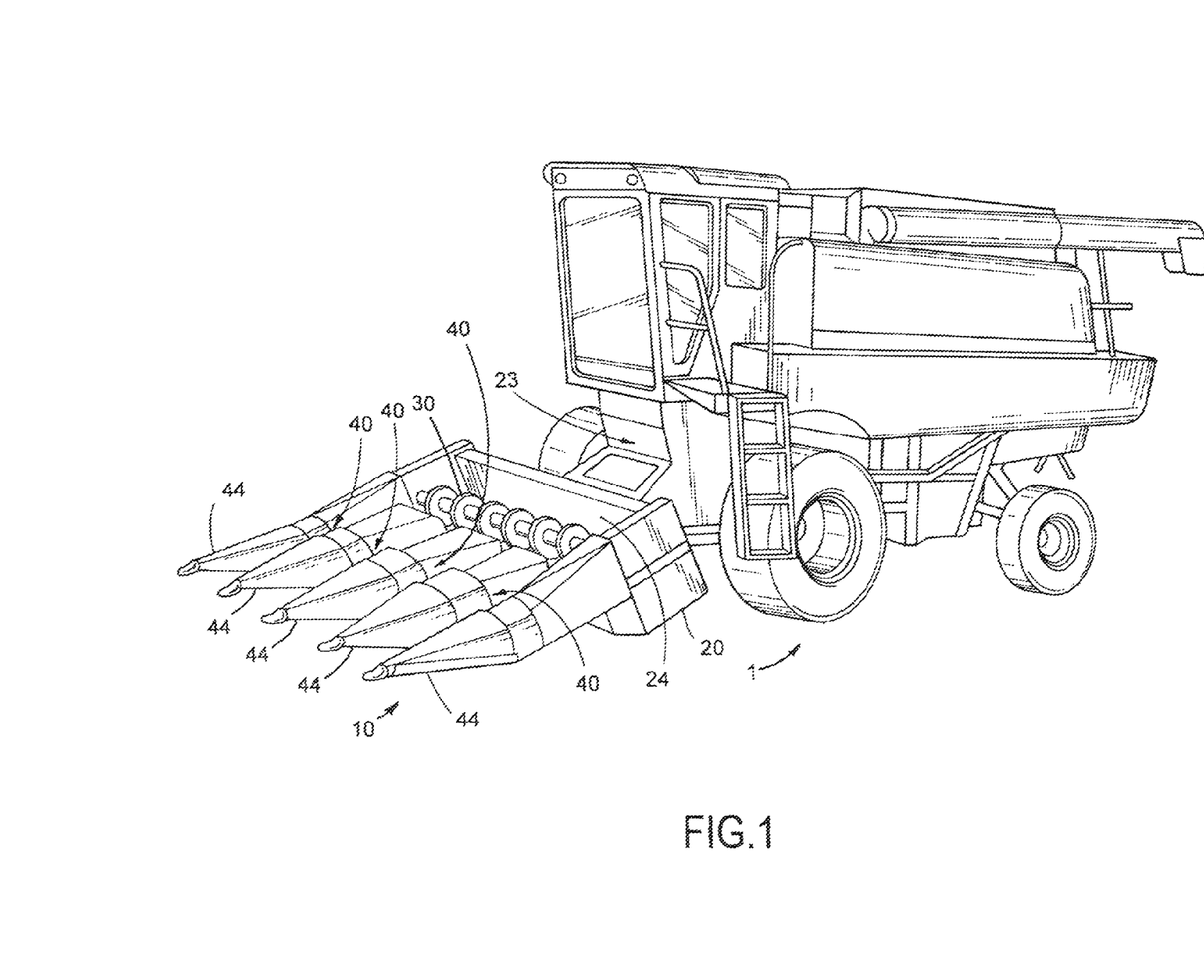
FIG. 1 is a perspective view of an agricultural combine including a corn head assembly according to a preferred embodiment of the present invention.

Referring now to the drawings, wherein preferred embodiments of the present invention are shown, FIG. 1 illustrates a corn head assembly 10 of the present invention as applied to an agricultural combine 1. The corn head assembly 10 is an improvement to current conventional corn head assemblies of agricultural combines by incorporating a means to prevent or inhibit grain loss at an initial point of contact between the corn head assembly and crop stalks. The corn head assembly 10 is shown to be operatively connected to the agricultural combine 1 for harvesting corn and feeding the corn to a feederhouse for receiving crop residue, cutting, chopping and propelling the residue rearwardly and outwardly from the agricultural combine 1 while retaining the valuable corn ears and kernels. Such feederhouses and harvesting operations are known in the art and a further detailed description of their structure, function and operation is not necessary for a complete understanding of the present invention. However, typical row crop header units applicable to the present invention are disclosed in U.S. Pat. Nos. 3,808,783 and 3,759,021, the entire disclosures of which are incorporated by reference herein. A variety of row crop dividers also applicable to the present invention is disclosed in U.S. Pat. No. 5,195,309, the entire disclosure of which is incorporated by reference herein.

Referring to FIGS. 2-4B, in a first preferred embodiment, the present invention provides a corn head assembly 10 for a combine harvester 1 for preventing crop loss without inhibiting crop flow. The corn head assembly 10 includes a frame 20 for mounting to a forward end of the combine harvester 1, a conveyor 30 (such as an auger) extending lengthwise across the frame 20 for conveying crop material to a combine feeding location or feederhouse 23, and a plurality of row units 40 extending forwardly from the frame 20. Each row unit 40 includes a catch plate 50 orientated and positioned for facingly engaging a flow of crop material during harvesting operations. The catch plate 50 includes a facing surface 52 having a nonplanar geometry.

Figure 2:
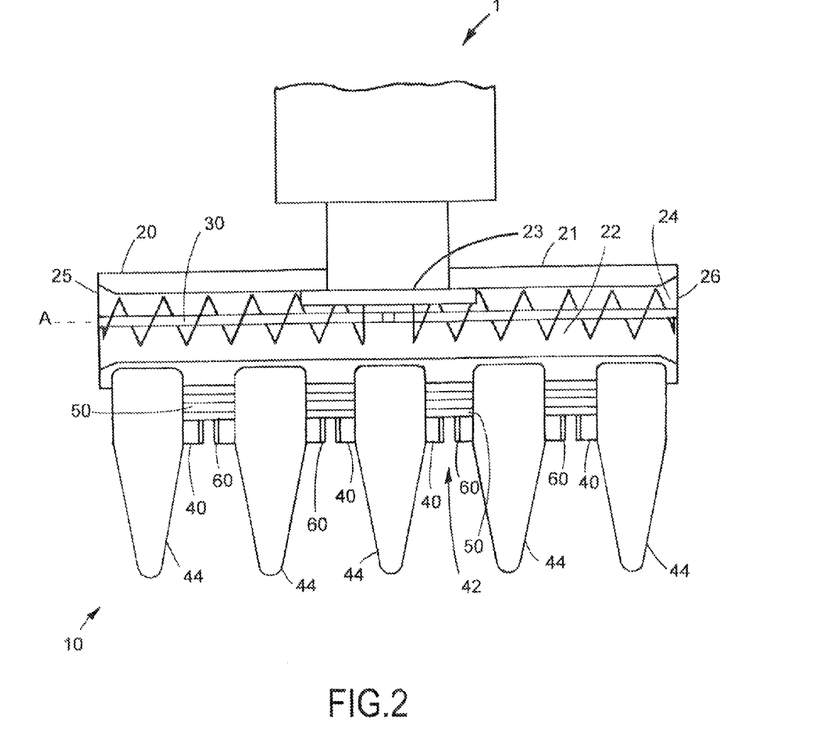
FIG. 2 is a top plan view of the corn head assembly of FIG. 1.
Figure 3:
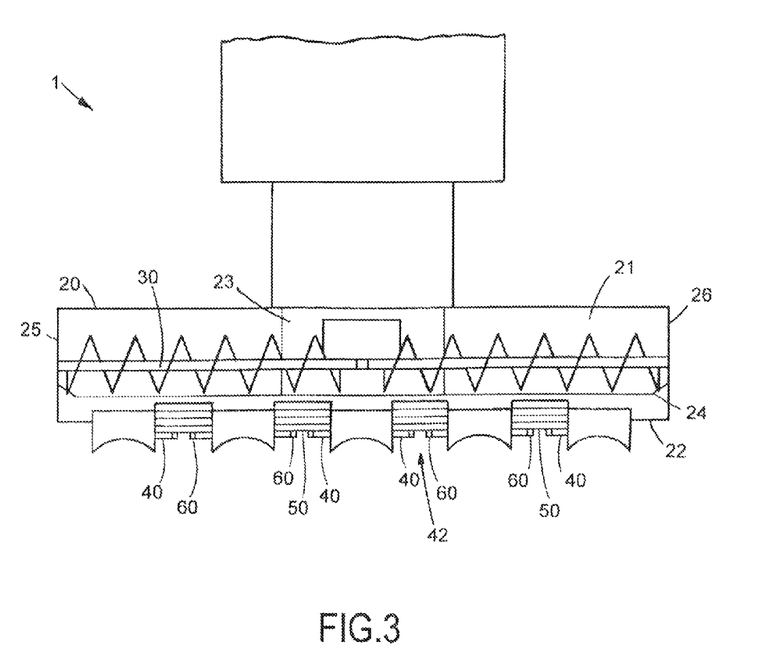
FIG. 3 is a front elevation view of the corn head assembly of FIG. 1.

Referring to FIGS. 1-3, the frame 20 is preferably configured as a substantially rectangular frame, as shown. However, the frame 20 may be configured as any shape suitable for the foregoing intended use. The frame 20 includes a rear wall 21, a bottom wall 22 and a pair of side walls 25, 26. The frame 20 further includes a channel 24 formed partially by the bottom wall 22. The conveyor 30 conveys harvested corn along the channel 24 to the combine feeding location 23 located adjacent a midpoint of the channel 24. As shown in FIG. 1, the frame 20 can be connected to a forward end of the combine harvester 1. Alternatively, the frame 20 can be connected to any device that has use for a corn head assembly 10.

The conveyor 30 is configured as best shown in FIG. 2. The conveyor 30 is preferably a screw auger conveyor, but can alternatively be any conveyor capable of moving grain through the channel 24, such as a paddle system, a conveyor belt, a pressure based system, or any combination thereof. Such conveyors are known in the art and a further detailed description of their structure, function and operation is not necessary for a complete understanding of the present invention. However, typical augers applicable to the present invention are disclosed in U.S. Pat. Nos. 8,267,240 and 4,621,968, the entire disclosures of which are incorporated by reference herein.

The auger 30 is connected to the frame 20 at the side walls 25, 26 and rotates about axis A. The half of the auger 30 that is closest to side wall 25 moves the harvested crop towards the opposite side wall 26 and the half of the auger 30 that is closest to side wall 26 moves the harvested crop towards the opposite side wall 25. The auger 30 is positioned in front or above the combine feeding location 23 and as the auger 30 rotates, harvested grain moves towards the center of the auger 30 for feeding the harvested grain into the combine feeding location 23.

Figure 11:
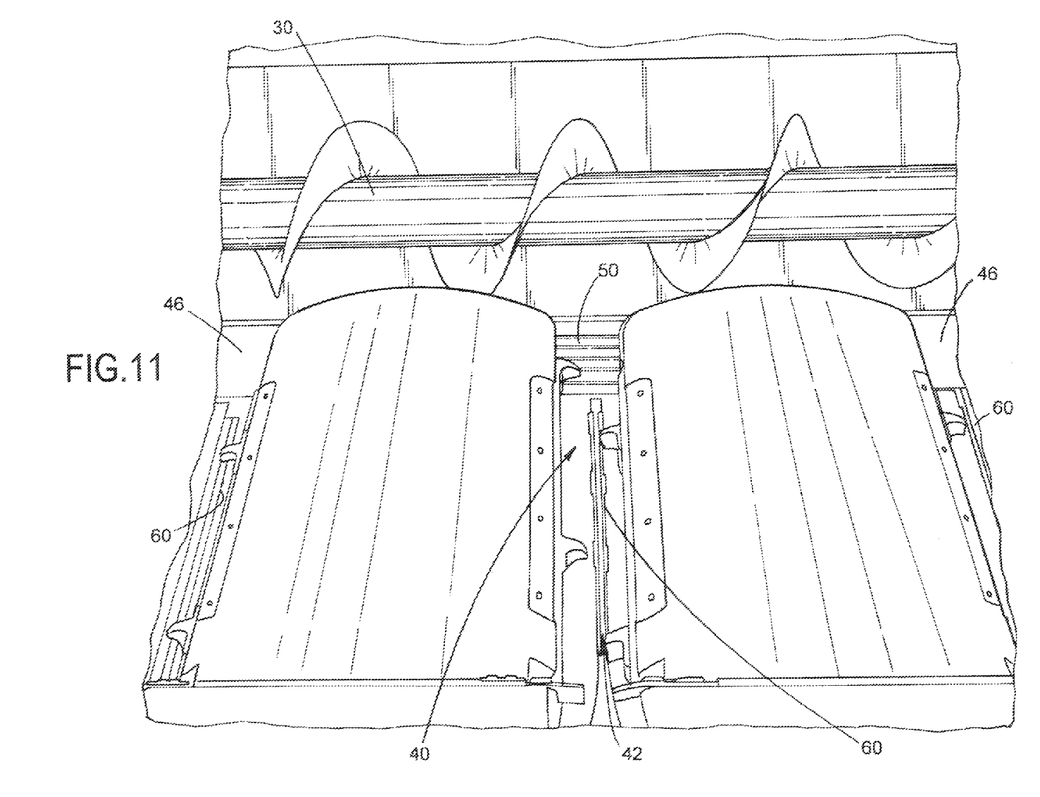
FIG. 11 is an enlarged partial front view of the corn head assembly of FIG. 1.
Figure 12:
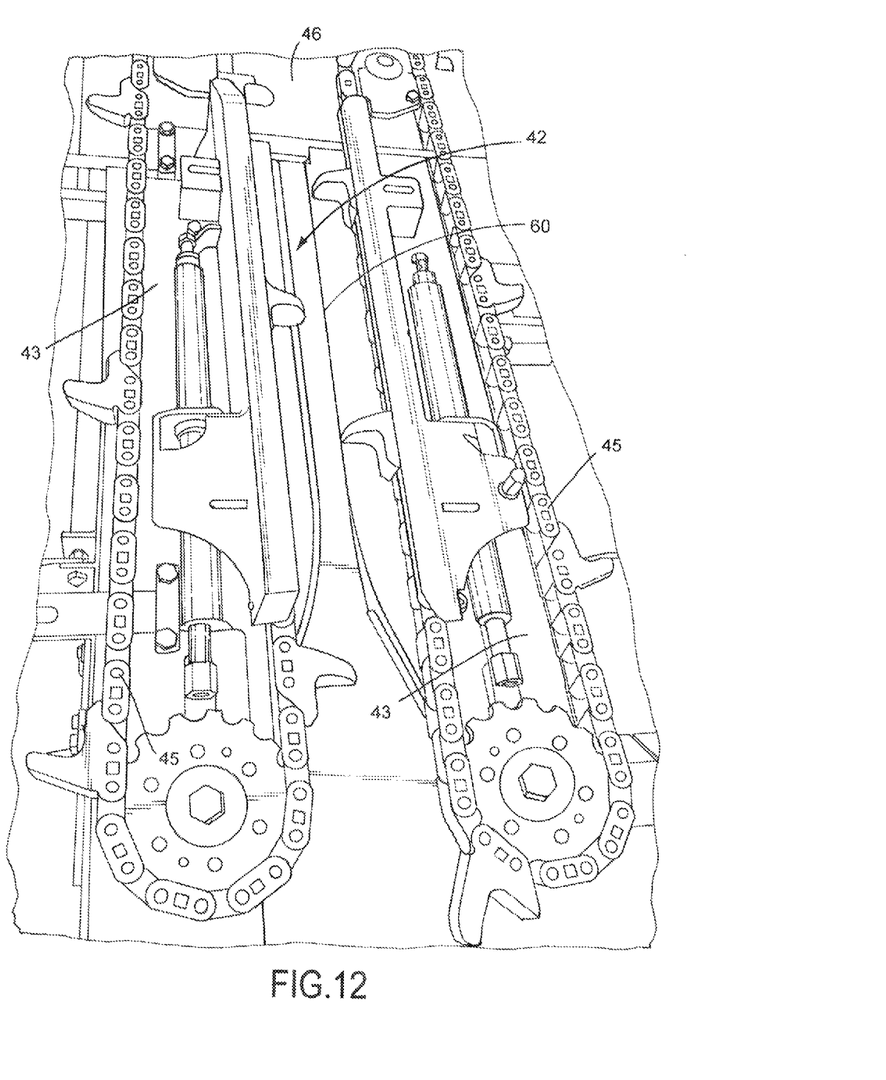
FIG. 12 is an enlarged partial perspective view of a row unit of the corn head assembly of FIG. 1.
Figure 13:
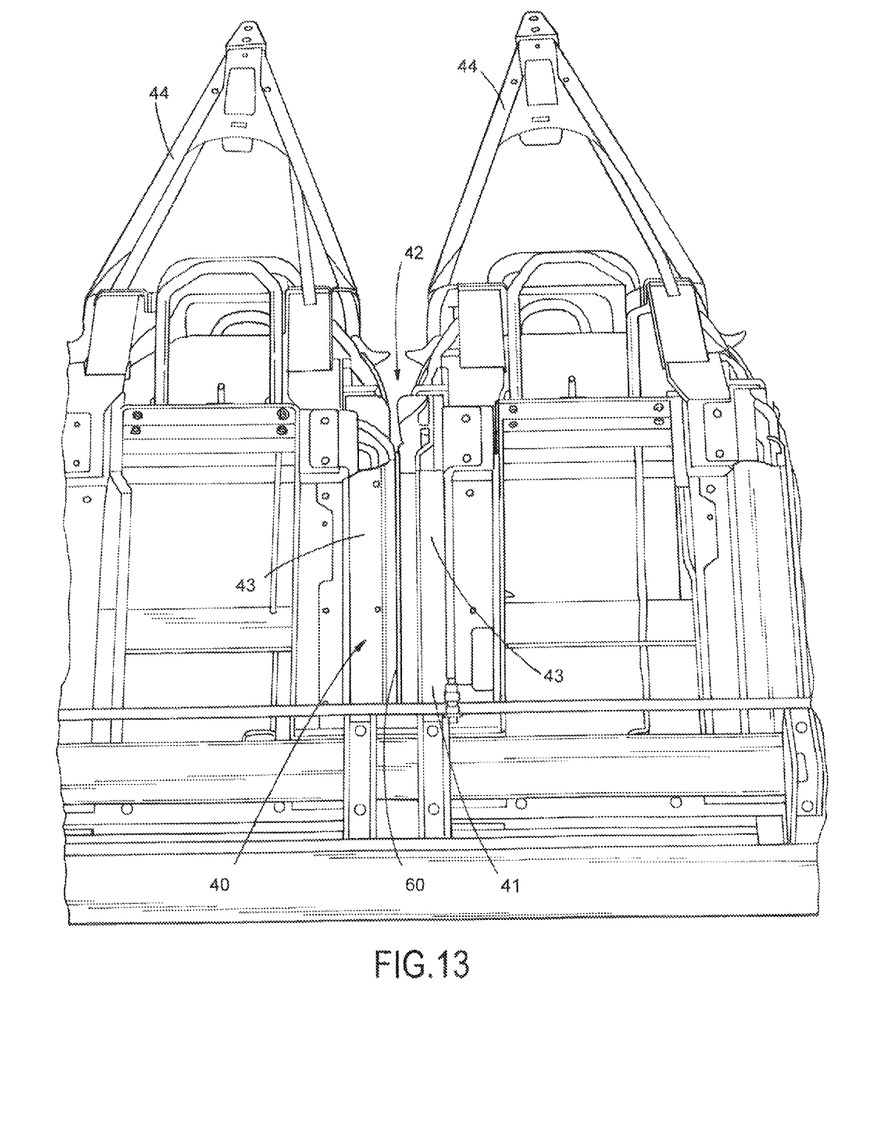
FIG. 13 is an enlarged partial bottom view of the corn head assembly of FIG. 1.

Referring to FIGS. 1-3 and 11-13, the corn head assembly 10 includes a plurality of row units 40 each configured as best shown in FIGS. 11-13. Such row units 40 are known in the art and a further detailed description of their structure, function and operation is not necessary for a complete understanding of the present invention. However, typical row units applicable to the present invention are disclosed in U.S. Pat. Nos. 7,913,480, 7,874,134 and 7,373,767, the entire disclosures of which are incorporated by reference herein. Each of the plurality of row units 40 is attached to the frame 20 and extends in a forward direction from the frame 20 and away from the combine harvester 1.

As shown in FIGS. 11-13, each row unit 40 includes a row unit frame 41 having a pair of row unit arms 43 connected by a breast plate 46 located about the rear of the row unit 40.

Mounted length wise on each row unit arm 43 is a gather chain 45 that directs corn stalks to the rear of the row unit 40 for the removal of corn ears from the stalks by the deck plate (also commonly known as a stripping plate) 60. In operation, crop material is stripped from the stalk and then travels across the breast plate 46 to the channel 24. The crop material stripped from the stalk is propelled rearwardly to the channel 24 due to the continuous flow of harvested crop material flowing rearwardly as a result of actions of the gather chain 45.

Referring again to FIGS. 1-2, the corn head assembly 10 further includes a plurality of dividers 44 extending forward from the frame 20. Such dividers 44 are known in the art and a further detailed description of their structure, function and operation is not necessary for a complete understanding of the present invention. However, typical dividers applicable to the present invention are disclosed in U.S. Pat. Nos. 6,625,969 and 7,073,316, the entire disclosures of which are incorporated by reference herein. The dividers 44 extend forwardly from the frame 20 and are connected to the plurality of row units 40 as shown in FIGS. 11-13, for directing a row of corn stalks towards the stripping plate 60 of the row unit 40.

As best shown in FIGS. 2-4B, the catch plate 50 is a substantially rectangular shaped plate. However, the catch plate 50 may be configured in any shape suitable for the foregoing intended use, including circular, triangular, trapezoidal or a shape conforming to the shape of the breast plate 46 so as to completely cover the breast plate 46. The catch plate 50 can be integrally formed as part of the breast plate 46 of the row unit 40. However, the catch plate 50 is preferably mounted to the breast plate 46 of the row unit 40. The catch plate 50 is preferably an individual plate mounted to the row unit 40 and located between a pair of dividers 44 (FIG. 14).

Figure 14:
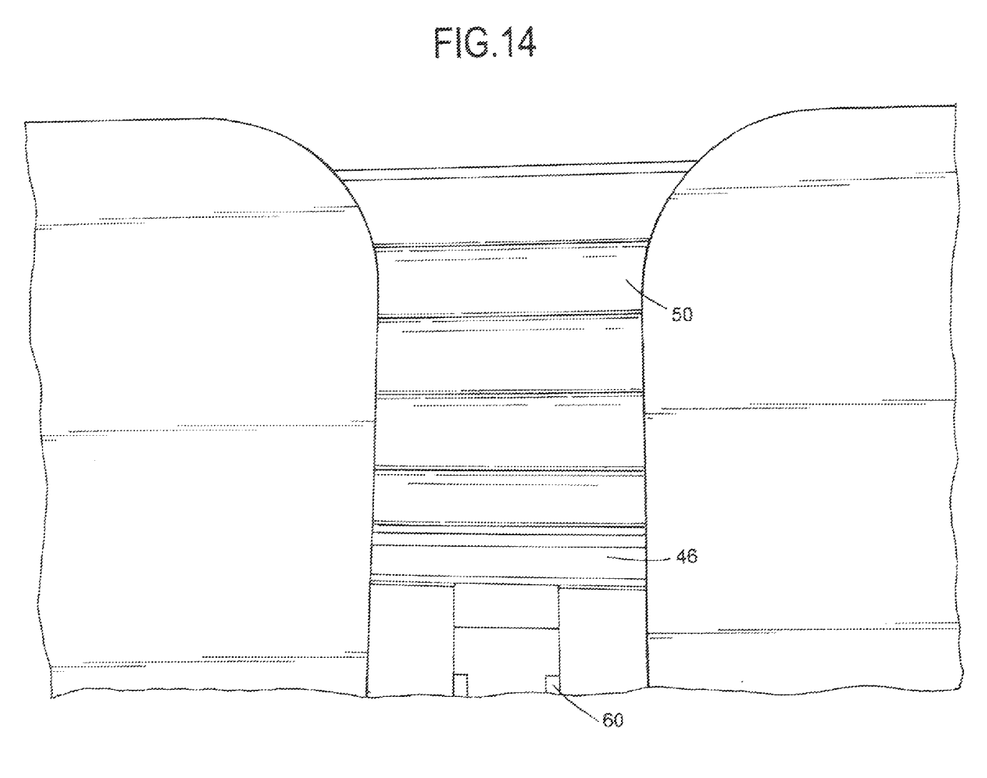
FIG. 14 is an enlarged top plan view of the catch plate of the corn head assembly of FIG. 1.

Referring to FIG. 14, the catch plate 50 is mounted onto the breast plate 46 of the row unit 40, as such the catch plate 50 is positioned between the stripping plate 60 and the conveyor 30. The catch plate 50 is also positioned in front of the channel

24. Furthermore, the catch plate 50 extends substantially across an entire width of the breast plate 46 of the row unit 40, as shown in FIG. 13.

Figure 4A:
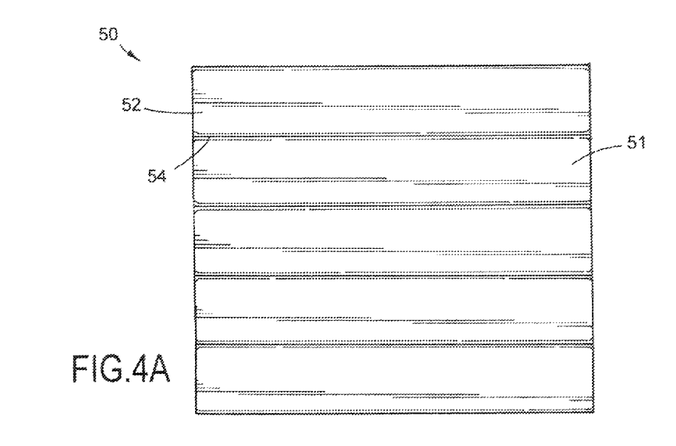
FIG. 4A is a top plan view of a catch plate of the corn head assembly of FIG. 1 having terraces.
Figure 4B:
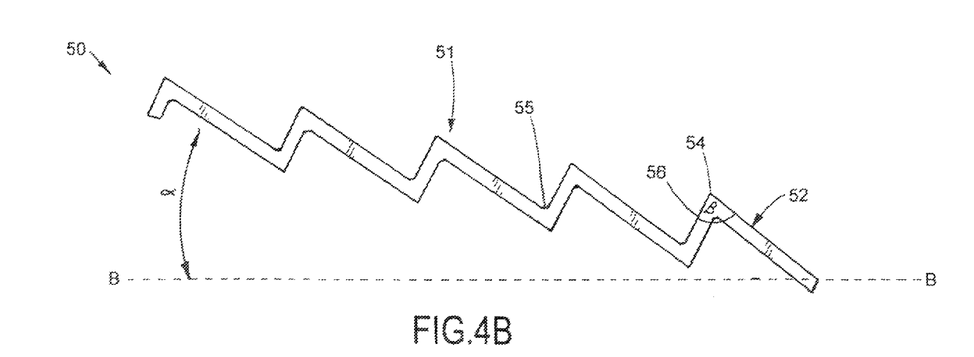
FIG. 4B is a side elevation view of the catch plate of FIG. 4A.
Figures 5A, 5B:
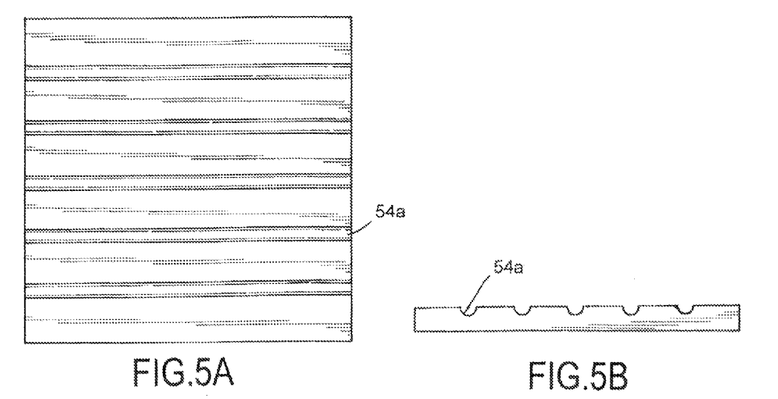
FIG. 5A is a top plan view of a catch plate of the corn head assembly of FIG. 1 having corrugations.
FIG. 5B is a side elevation view of the catch plate of FIG. 5A.
Figures 6A, 6B:
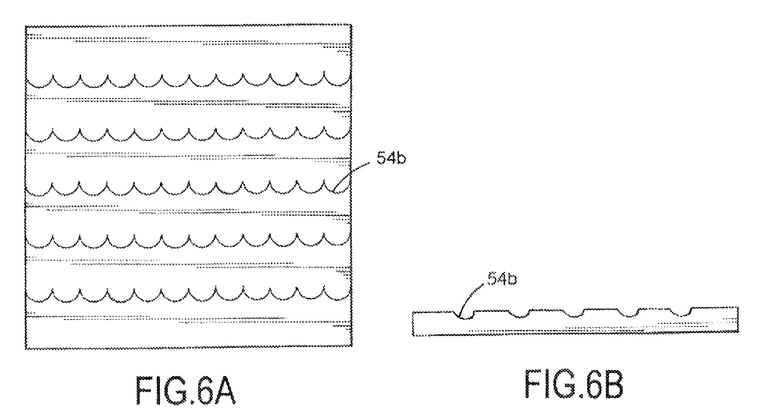
FIG. 6A is a top plan view of a catch plate of the corn head assembly of FIG. 1 having scales.
FIG. 6B is a side elevation view of the catch plate of FIG. 6A.
Figures 7A, 7B:
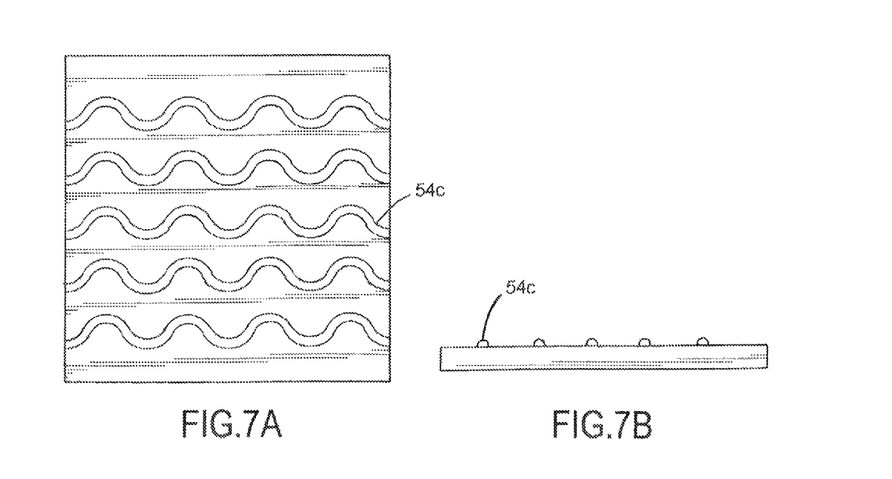
FIG. 7A is a top plan view of a catch plate of the corn head assembly of FIG. 1 having waves.
FIG. 7B is a side elevation view of the catch plate of FIG. 7A.
Figures 8A, 8B:
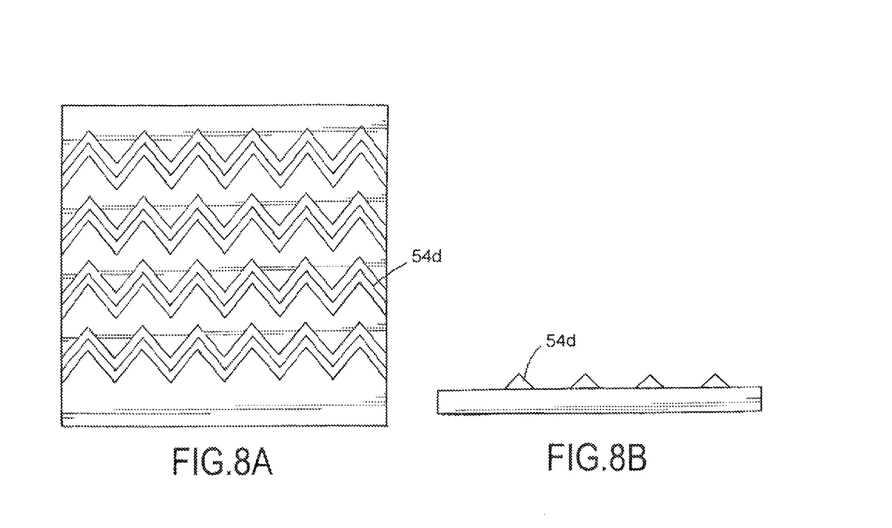
FIG. 8A is a top plan view of a catch plate of the corn head assembly of FIG. 1 having chevron-shaped corrugations.
FIG. 8B is a side elevation view of the catch plate of FIG. 8A.
Figures 9A, 9B:
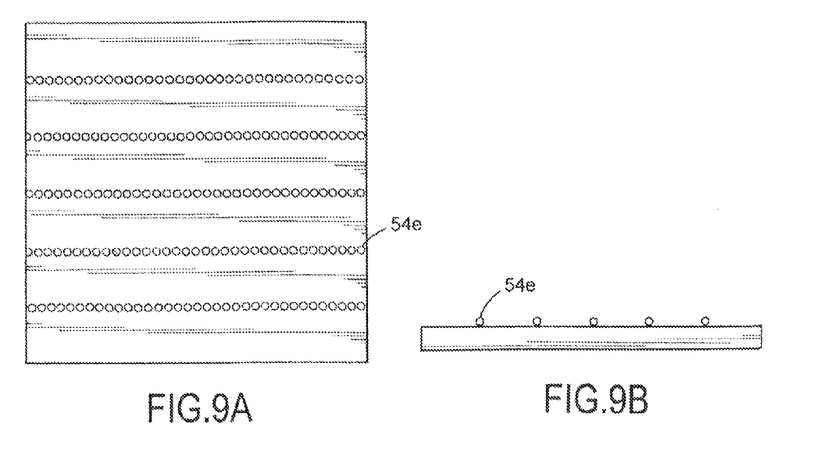
FIG. 9A is a top plan view of a catch plate of the corn head assembly of FIG. 1 having weld beads.
FIG. 9B is a side elevation view of the catch plate of FIG. 9A.
Figures 10A, 10B:
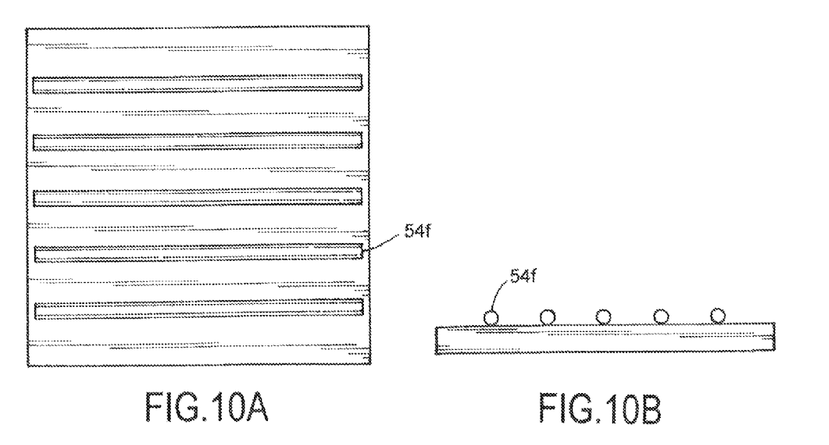
FIG. 10A is a top plan view of a catch plate of the corn head assembly of FIG. 1 having rods.
FIG. 10B is a side elevation view of the catch plate of FIG. 10A.

As shown in FIG. 4B, the catch plate 50 includes a facing surface 51 (also referred to as an engaging surface). The facing surface 51 has a nonplanar geometry. The nonplanar geometry can be at least one of corrugations 54a (FIGS. 5A and 5B), scales 54b (FIGS. 6A and 6B), waves 54c (FIGS. 7A and 7B), chevron-shaped corrugations 54d (FIGS. 8A and 8B), weld beads 54e (FIGS. 9A and 9B), rods 54f (FIGS. 10A and 10B), and terraces 54 (FIGS. 4A and 4B) or combinations thereof, or any other nonplanar geometry sufficient to retain, prevent, or hinder grain from sliding down its facing surface 51. Additionally, the nonplanar geometry can include projections extending away from the surface. The nonplanar geometry can be integrally formed as part of the catch plate 50 or attached to the facing surface 51, such as by welding or other fixation means. Additional attachable members can also be attached to the facing surface 51, which preferably extend away from the facing surface 51 and have cross-sections of e.g., at least one of a circle, a rectangle, and a triangular or combinations thereof, or any other cross-section sufficient to retain, prevent, or hinder grain from sliding down the facing surface.

As shown in FIG. 4B, the nonplanar geometry of the catch plate 50 is preferably configured as terraces 54. The facing surface 51 of the catch plate 50, when mounted on the breast plate 46 of the row unit 40, faces in an upwardly and forwardly direction. In other words, the facing surface 51 is sloped relative to a horizontal plane B (e.g., the ground). The facing surface 51 is preferably angled about 10 to 45 degrees (α) from the horizontal plane B. More preferably, the facing surface 51 is angled about 15 to 25 degrees from the horizontal plane B.

The terraces of the catch plate 50 are formed to have a substantially step-wise configuration, as shown in FIG. 4B. In particular, the terraces are formed by a substantially rearwardly facing surface 56 and a substantially upwardly facing surface 52 when the catch plate 50 is mounted to the row unit 40. The upwardly facing surface 52 extends from the rearwardly facing surface 56 at about a 90 degree angle, but preferably at about angle (β) slightly less than 90 degrees such as 85, 80, 75, 70 65, 60 and 55 degrees so as to form a trough 55 therebetween that extends substantially parallel to the channel 24.

The catch plate 50 can optionally be adjustably mounted to the row unit 40 so as to rotate and change the angle α, relative to the horizontal. As shown in FIGS. 2 and 13, the catch plate 50 is positioned anterior to the auger 30 and below the conveyor 30. The catch plate 50 is also positioned between the auger 30 and the plurality of row units 40. Additionally, the catch plate 50 is positioned between adjacent individual dividers 44.

Each row unit 40 of the corn head assembly 10 includes the stripping plate 60, as best shown in FIG. 12. The stripping plate 60 is configured, as shown, in FIGS. 11 and 12. The stripping plate 60 functions to remove ears of corn from the corn stalk in a manner well known in the art. Accordingly, a further detailed description of its structure, function and operation is not necessary for a complete understanding of the present invention. However, a typical stripping plate applicable to the present invention is disclosed in U.S. Pat. No. 7,062,897, the entire disclosure of which is incorporated by reference herein.

As shown in FIGS. 12-14, the stripping plate 60 is located adjacent to the catch plate 50 and at the forward end of the combine harvester 1. The catch plate 50 is located between the stripping plate 60 and the conveyor 30. The stripping plate 60 is also located below and in front of the catch plate 50.

In operation, during harvesting, rows of plants to be harvested are aligned and directed to a gap 42 formed by the stripping plates 60. As the combine harvester 1 moves across a row of harvesting crops, plants are guided towards the gap 42 where ears of corn are then stripped from the stalks due to the stripping plates 60 and operation of stalk rollers which pull the stalk material in a downwardly direction. The stalks remain on the ground and the ears of corn move rearward and into the frame 20. The conveyor 30 then moves the ears of corn to the center of the frame 20 so as to be fed into the combine feeding location 23. The configuration and operation of the intake arrangements are typical of a standard combine harvester 1.

During the stripping process kernels of corn can be stripped from the ears and fall onto the combine harvester's breast plate 46 and then towards the ground. However, the catch plate 50, being positioned to cover the breast plate 46 and between the plurality of dividers 44 and downstream the stripping plate 60, effectively prevents or inhibits the flow of grain falling on the breast plate region from being deposited on the ground. That is, loose grain which is distributed on the breast plate region will now be retained by the catch plate 50 and recoverable for transport to the channel 24 by the flow of subsequent crop material over the catch plate 50.

The catch plate 50 solves the problem of lost grain that results from grain falling on the breast plate region of each row unit 40. Specifically, the nonplanar geometry keeps the grain from sliding forward and down towards the ground without inhibiting crop flow. In a preferred embodiment, as shown in FIG. 4B, grain that slides forward will be stopped by the rear face 56 and eventually settle in trough 55. The grain will remain in the trough 55 due to the height of the rear face 56 if the combine harvester 1 is moving or stopped. Thereafter, subsequent crop material being stripped by the stripping plate 60 will interact with the grain in the trough 55 and push or pull the grain on the catch plate 50 rearward so as to be deposited in the channel 24 and eventually to the combine feeding location 23.

It will be appreciated by those skilled in the art that changes could be made to the embodiments described above without departing from the broad inventive concept thereof. For example, alternative components and methods of cooperatively engaging the catch plate to the corn head assembly can be used. It is to be understood, therefore, that this invention is not limited to the particular embodiment disclosed, but it is intended to cover modifications within the spirit and scope of the present invention as defined by the appended claims.

I claim:

1. A corn head assembly for a combine harvester comprising:
   a frame for mounting to a forward end of the combine harvester;
   a conveyor extending across the frame for conveying crop material to a combine feeding location;
   a plurality of row units extending forward from the frame, each row unit including a catch plate for facingly engaging a flow of crop material, a surface area of the catch plate with irregularities that mitigate a sliding of grain from the surface area,
   a gather chain that is mounted on each row unit, the gather chain directs corn stalks to an end of a row unit for removal of corn ears from stalks, and
   a stripping plate that removes corn ears from stalks.

2. The corn head assembly of claim 1, wherein the nonplanar geometry is at least one of corrugations, scales, waves, chevron-shaped corrugations, weld beads, rods, and terraces.

3. The corn head assembly of claim 1, wherein the facing surface of the catch plate faces in an upwardly and forwardly direction.

4. The corn head assembly of claim 1, wherein the catch plate is angled about 10 to 45 degrees from a horizontal plane.

5. The corn head assembly of claim 1, wherein the catch plate is angled about 15 to 25 degrees from a horizontal plane.

6. The corn head assembly of claim 1, wherein the catch plate is sloped relative to a horizontal plane.

7. The corn head assembly of claim 1, wherein the catch plate is positioned anterior to the conveyor.

8. The corn head assembly of claim 1, wherein the catch plate is positioned below the conveyor.

9. The corn head assembly of claim 1, further includes a plurality of dividers extending forward from the frame and the catch plate is positioned between a pair of dividers.

10. The corn head assembly of claim 1, wherein the catch plate is positioned between the stripping plate and the conveyor.

11. The corn head assembly of claim 1, wherein the catch plate is adjustably mounted to the row unit.

12. The corn head assembly of claim 1, wherein the catch plate is integrally formed as part of a breast plate of the row unit.

13. The corn head assembly of claim 1, wherein the catch plate is mounted to a breast plate of the row unit.

14. The corn head assembly of claim 1, wherein the catch plate is positioned above the stripping plate.

15. The corn head assembly of claim 1, wherein catch plate extends substantially across an entire width of a breast plate of the row unit.

16. The corn head assembly of claim 1, wherein the frame includes a channel leading to the combine feeding location and the catch plate is positioned in front of the channel.

17. The corn head assembly of claim 1, wherein the nonplanar geometry comprises a plurality of attachable members attached to the facing surface.

18. A corn head assembly for a combine harvester comprising:
a frame for mounting to a forward end of the combine harvester;
a conveyor extending across the frame for conveying crop material to a combine feeding location; and
a plurality of row units extending forward from the frame, each row unit including:
a row unit frame having a breast plate,
a stripping plate mounted to the row unit frame, to remove corn ears from stalks,
a gather chain that is mounted on each row unit, the gather chain directs corn stalks to an end of a row unit for removal of corn ears from stalks,
a catch plate mounted rearwardly of the stripping plate, wherein the catch plate includes an engaging surface area having a non-smooth geometry with irregularities that mitigate a sliding of grain from the engaging surface area.

19. The corn head assembly of claim 18, wherein the nonplanar geometry is at least one of corrugations, scales, waves, chevron-shaped corrugations, weld beads, rods and terraces.

20. The corn head assembly of claim 18, wherein the nonplanar geometry includes projections extending from the engaging surface.

21. The corn head assembly of claim 18, wherein the catch plate is positioned below the conveyor.

22. The corn head assembly of claim 18, wherein the engaging surface of the catch plate is sloped relative to a horizontal plane.

23. The corn head assembly of claim 18, wherein the nonplanar geometry comprises a plurality of attachable members attached to the facing surface.

* * * * *